Patented Jan. 29, 1929.

1,700,581

UNITED STATES PATENT OFFICE.

WILFRED ERNEST BILLINGHAME, OF LEE, ENGLAND.

EMULSIFICATION OF TAR, BITUMEN, CREOSOTE, PETROLEUM, HEAVY OILS, AND THE LIKE.

No Drawing. Application filed November 21, 1925, Serial No. 70,700, and in Great Britain November 27, 1924.

This invention has reference to the emulsification of tar, bitumen, creosote, petroleum, heavy oils and the like.

The invention has for its object to provide an improved process of emulsifying tar, bitumen, creosote, petroleum and heavy oils and the like.

According to this invention I first prepare a concentrated emulsion of a comparatively small quantity of tar, bitumen, creosote, petroleum, heavy oil or the like, and then employ this concentrated emulsion as an emulsifying agent for emulsifying a larger quantity of tar, bitumen, creosote, petroleum, heavy oil or the like.

The following illustrates one way in which the invention may be carried into effect in, for example, the emulsification of crude or refined tar, the parts being by weight:—

I may first treat liquid rosin with alkali to produce a neutral rosin compound containing about 39% of rosin. To one part of this rosin compound, in a mixing machine, I add one part of tar and thoroughly mix the rosin compound and tar together. To this mixture of rosin compound and tar I add two parts of a solution of soluble casein or other suitable protein and thoroughly mix the whole together. The resulting product, which is itself a concentrated emulsion of the tar with the water of the solution of soluble casein or other protein, I may employ as an emulsifying agent in the following manner:—

To one part of the emulsifying agent I may add nine parts of water and thoroughly mix. This aqueous mixture or diluted emulsifying agent is slowly added to ten parts of tar during stirring or agitation which is continued for a little while after the whole of the aqueous mixture or diluted emulsifying agent has been added when a perfect aqueous emulsion of the tar results. This emulsion may be diluted by the addition of a further quantity of water which should be added slowly during stirring or agitation. Alternatively, the ten parts of tar may be slowly added to the one part of emulsifying agent during stirring or agitation which should be continued for a little while after all the tar has been got in, and the necessary volume of water to make up the required aqueous emulsion may afterwards be added slowly during stirring or agitation.

In the final aqueous emulsion there may be incorporated from about 10% to 50% of finely divided china or like clay, calculated on the weight of the tar contained in the emulsion. The addition of china clay makes the emulsion thicker and more stable.

Instead of employing liquid rosin in the preparation of the rosin compound I may employ any other suitable rosin. Further, instead of employing rosin compound in the preparation of the emulsifying agent I may employ any suitable soap.

It will be understood that bitumen and bituminous and like materials must be employed in a melted and pourable state in the preparation of the emulsifying agent and during the addition of the concentrated or diluted emulsifying agent to the bulk of material under treatment. Except for this melting of bitumen and bituminous and like materials it is unnecessary to apply heat during the preparation of the emulsifying agent or during the use of same to emulsify larger quantities of the material under treatment.

The solution of soluble casein or other protein may be prepared by dispersing about nine parts of casein or other protein in about eighty-four parts of water and adding thereto during stirring, about one part of caustic potash or caustic soda dissolved in about six parts of water. No heat is applied during the action of the alkali on the protein as it is important that the alkali should not attack and break down the protein. I may, however, employ soluble protein prepared in any other suitable way.

For emulsifying bitumen, creosote, petroleum, heavy oils and the like, I substitute such materials for the tar in the preparation of the emulsifying agent.

The final emulsions may be used for many purposes among which may be mentioned coating road-making materials and aggregates, coating stone, metal, wood and other materials to protect same from the weather, and waterproofing felt and other materials.

What I claim as my invention and desire to secure by Letters Patent is:—

1. The process of emulsifying tar, bitumen, creosote, petroleum, heavy oils and like materials, which consists in first preparing a concentrated emulsion of a small quantity of such a material and then employing this concentrated emulsion as an emulsifying agent for emulsifying a larger quantity of the same material.

2. The process of emulsifying tar, bitumen, creosote, petroleum, heavy oils and like materials, according to claim 1 wherein the concentrated emulsion or emulsifying agent is prepared by blending the small quantity of material with a saponaceous ingredient and soluble protein.

3. A process of emulsifying tar, bitumen, creosote, petroleum, heavy oils and like materials, according to claim 1 wherein the concentrated emulsion or emulsifying agent is prepared by blending the small quantity of material with neutral rosin compound and an aqueous solution of soluble casein.

In witness whereof I have hereunto set my hand.

WILFRED ERNEST BILLINGHAME.